US011895606B2

(12) United States Patent
Hosseinian et al.

(10) Patent No.: US 11,895,606 B2
(45) Date of Patent: Feb. 6, 2024

(54) METHODS FOR UPDATING TIMING ADVANCE AND BEAM AND BANDWIDTH PART SWITCHING FOR NON-TERRESTRIAL NETWORKS

(71) Applicant: Samsung Electronics Co., Ltd., Gyeonggi-do (KR)

(72) Inventors: Seyed Mohsen Hosseinian, San Diego, CA (US); Philippe Sartori, Naperville, IL (US)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/711,550

(22) Filed: Apr. 1, 2022

(65) Prior Publication Data
US 2022/0353837 A1 Nov. 3, 2022

Related U.S. Application Data

(60) Provisional application No. 63/225,076, filed on Jul. 23, 2021, provisional application No. 63/182,477, filed on Apr. 30, 2021.

(51) Int. Cl.
*H04W 56/00* (2009.01)
*H04W 84/06* (2009.01)

(52) U.S. Cl.
CPC ..... *H04W 56/0015* (2013.01); *H04W 56/007* (2013.01); *H04W 56/009* (2013.01); *H04W 84/06* (2013.01)

(58) Field of Classification Search
CPC ........... H04W 56/0015; H04W 56/009; H04W 56/007; H04W 84/06
See application file for complete search history.

(56) References Cited

U.S. PATENT DOCUMENTS

| 10,750,534 | B2 | 8/2020 | Son |
| 10,784,944 | B2 | 9/2020 | Cirik et al. |
| 2019/0313332 | A1 | 10/2019 | Wu et al. |
| 2020/0052782 | A1 | 2/2020 | Wang et al. |
| 2020/0412437 | A1 | 12/2020 | Cirik et al. |
| 2022/0329314 | A1* | 10/2022 | Liu ............... H04W 56/0045 |
| 2023/0038582 | A1* | 2/2023 | Lin ............... H04B 7/18519 |

OTHER PUBLICATIONS

ATIS.3GPP.38.821.V1600 3rd Generation Partnership Project; Technical Specification Group Radio Access Network; Solutions for NR to support non-terrestrial networks (NTN) (Release 16), pp. 141.
Thales, 3GPP TSG RAN WG1 Meeting #104-bis-e R1-2102360 e-Meeting, "Considerations on UL timing and frequency synchronization in NTN" Apr. 12-Apr. 20, 2021, pp. 21.

* cited by examiner

*Primary Examiner* — Jianye Wu
(74) *Attorney, Agent, or Firm* — The Farrell Law Firm, P.C.

(57) ABSTRACT

A method of performing a timing advance adjustment between a user equipment (UE) and a non-terrestrial network (NTN) includes receiving and decoding a medium access control (MAC) control element (CE) including closed loop information; receiving and decoding system information including open loop information; determining a timing advance value based on either the closed loop information or the open loop information; and controlling timing of an uplink transmission signal, transmitted from the UE, based on the timing advance value.

20 Claims, 11 Drawing Sheets

METHODS FOR UPDATING TIMING ADVANCE AND BEAM AND BANDWIDTH PART SWITCHING FOR NON-TERRESTRIAL NETWORKS

PRIORITY

This application is based on and claims priority under 35 U.S.C. § 119(e) to U.S. Provisional Patent Application Ser. No. 63/225,076, filed on Jul. 23, 2021, and 63/182,477, filed on Apr. 30, 2021, the entire content of each of which is incorporated herein by reference.

FIELD

The present disclosure is generally related to improving wireless communication for non-terrestrial networks (NTN).

BACKGROUND

In wireless communication systems, a timing advance (TA) may be calculated to account for propagation delay. For a new radio (NR) NTN user equipment (UE), calculating an accurate TA is especially important because NTN frequently requires sending signals over particularly long distances (e.g., from Earth to satellites), and the propagation delay is thus longer.

TA applied by an NR NTN UE in an RRC_CONNECTED state may include two components, namely, an open-loop component (e.g., when TA is estimated autonomously by the UE) and a closed-loop component (e.g., when a TA command is provided by the network). Adding the closed loop TA component provided by the network (e.g., received from a base station (gNB)) and the open loop TA component that has been autonomously estimated by the UE may result in an inaccurate TA value since, for example, the resulting TA should be based on the latest uplink transmission and is susceptible to being outdated. In addition, autonomous TA estimation by the UE could be erroneous due to an estimation error that the UE may have for the open-loop TA component. Further, even in cases in which both the closed loop TA component and the open loop TA component are accurate, applying both components may erroneously result in double correction, and thus the resulting TA command would not suffice for performing satisfactory wireless communication, Accordingly, a solution is needed to combine both closed loop and open loop TA updates to achieve improved TA timing estimation.

Additionally, NTN may be required to support UE mobility up to 1,200 kilometers/hour (km/h) speeds. Moreover, low Earth orbit (LEO) satellites could travel at speeds up to 7.4 km/second (s). For an LEO satellite, even if the footprint size of a beam is 1000 km, it takes only about 2 minutes for a UE to switch from one beam to another. In more practical scenarios, the footprint size of an LEO satellite beam could be much smaller than 1000 km and therefore the dwell time that a UE stays in a beam and then switches to another could be much shorter than 2 minutes. Satellite movements (including speed and/or direction), however, may be accurately predicted. The predictability of the satellite movement can be utilized to assist faster beam switching with a lower amount of signaling.

Thus, a solution is also needed to develop NR specifications to support efficiently configured beam and bandwidth part (MVP) switching.

SUMMARY

The present disclosure has been made to address the above-mentioned problems and disadvantages, and to provide at least the advantages described below.

In accordance with an aspect of the present disclosure, a method of performing a timing advance adjustment between a UE and an NTN includes receiving and decoding a medium access control (MAC) control element (CE) including closed loop information; receiving and decoding system information including open loop information; determining a timing advance value based on either the closed loop information or the open loop information; and controlling timing of an uplink transmission signal, transmitted from the UE, based on the timing advance value.

In accordance with another aspect of the present disclosure, a UE is provided. The UE includes a memory and a processor configured to receive and decode an MAC CE including closed loop information; receive and decoding system information including open loop information; determine a timing advance value based on either the closed loop information or the open loop information; and control timing of an uplink transmission signal, transmitted from the UE, based on the timing advance value.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
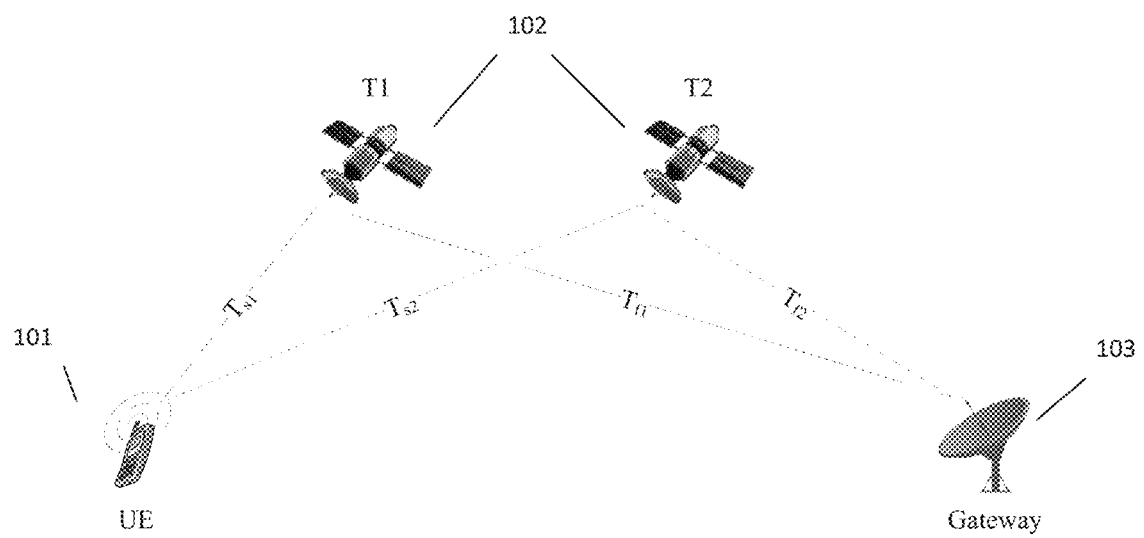
FIG. 1 is a diagram illustrating signaling among a UE, a satellite, and a gNB, according to an embodiment.

Hereinafter, embodiments of the present disclosure are described in detail with reference to the accompanying drawings. The same or similar elements may be designated by the same reference numerals although they are shown in different drawings.

In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure.

In addition, descriptions of well-known functions and constructions are omitted for clarity and conciseness.

The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Terms such as "1st," "2nd," "first," and "second" may be used to distinguish a corresponding component from another component, but are not intended to limit the components in other aspects (e.g., importance or order). If an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present disclosure proposes providing a TA update for combining open-loop and closed-loop TA components based on a priority configuration. In addition, the present disclosure proposes beam/MVP switching based on network-initiated configured beam/BWP switching, UE-initiated configured beam/BWP switching, conditional beam/BWP switching, and group beam/BWP switching.

The present disclosure provides intelligent combinations of open-loop and closed-loop TA components to avoid double correction of the TA. In addition, the present disclosure proposes using predictability of the satellite movement to assist with faster beam switching that is more efficient and requires a lower amount of signaling than found in prior systems.

A TA may be used to control the uplink transmission timing of an individual UE, and to synchronize the uplink transmission of all UEs belonging to the network together. In $5^{th}$ generation (5G) NR, a TA for a first time is adjusted during initial access and the random access procedure based on a TA command field in msg2 and msgB, in 4-step and 2-step random access channel (RACH) procedures, respectively. Later, the update for TA in an RRC_CONNECTED state may be performed through a closed loop operation based on the TA command field in an MAC CE TA command.

To control uplink transmission timing, the UE may receive a first TA command in msg2/msgB. A set of 12 bits may be used to provide a value within the range from 0 to 3846. This value corresponds to $T_A$, which may be used to calculate $N_{TA}$ according to Equation (1), below.

$$N_{TA} = T_A \times 16 \times 64/2^\mu \qquad \text{Equation (1)}$$

After initial access, when the TA command is provided within the MAC CE to update the TA, $T_A$ is a 6 bit field that provides a value range from 0 to 63. This TA command is used to dynamically update the existing TA. The TA command provided during the random access procedure may be an absolute TA, whereas the subsequent TA command provided within MAC CE may be relative. The value of $N_{TA}$ may be updated according to Equation (2), below.

$$N_{TA,new} = N_{TA,old} + (T_A - 31) \times 16 \times 64/2^\mu \qquad \text{Equation (2)}$$

In Equation (2), $T_A$ is the TA command field received in the MAC CE command. The TA applied by the UE may be calculated according to Equation (3), below.

$$T_{TA} = (N_{TA} + N_{TA,offset}) \times T_c \qquad \text{Equation (3)}$$

In Equation (3), $T_c = 1/(480,000 \times 4096)$. The inclusion of $N_{TA,offset}$ may be specified to ensure that an uplink radio frame finishes before the start of the subsequent downlink radio frame. The TA command may be transmitted on a per-need basis and the granularity in the step size may be 0.52 microseconds (μs).

In NR NTN, a TA update in an RRC_CONNECTED state may experience extreme variations in the propagation delay and a TA command being outdated.

With regards to extreme variations in the propagation delay, in NTN, the radial velocity between the satellite and UE location can reach significant values especially for LEO and middle Earth orbit (MEO) satellites. As a result, the propagation delay may vary quickly across a wide range of values. For example, in case of an LEO satellite transparent payload at a 600 kilometers (km) altitude, the maximum NTN gateway (GW)-UE delay variation, as seen by the UE, could be up to ±40 µs/second (sec). In such conditions, performing a maintenance procedure based on a MAC CE may become challenging because the user-specific timing adjustment MAC CE commands must be sent frequently, leading to increased downlink signaling overhead.

With regards to the TA command being outdated, even if the problem with the downlink MAC CE signaling overload, discussed above, is overlooked, by the time the TA command arrives at UE, the TA command may be outdated. For example, in case of an LEO satellite scenario at a 1200 km altitude, for a one-way delay of 20.89 milliseconds (ms), a TA command sent by the gNB that is accurate at the time of its transmission can be outdated by 0.83 µs at the time of its arrival. This is larger than the cyclic prefix (CP) duration for 120 kHz subcarrier spacing (SCS), which is 0.59 µs. Therefore, data loss may occur since the TA command may be outdated.

FIG. 1 is a diagram illustrating signaling among a UE, a satellite, and a gateway, according to an embodiment.

Referring to FIG. 1, a network is provided that includes a UE 101, a satellite 102, and a gateway 103 (e.g., a gNB). The satellite is shown at a first position at time T1, and at a second position at time T2. In addition, two signal paths for the UE 101 to wirelessly communicate with the gateway 103 via the satellite 102 are shown. The first signal path includes the signal shown at times $T_{s1}$ and $T_{f1}$. The second signal path includes the signal shown at times $T_{s2}$ and $T_{f2}$. The signal in the first signal path is transmitted to the UE 101 from the gateway 103 (or to the gateway 103 from the UE 101) at time T1 and the signal in the second signal path is transmitted to the gateway 103 from the UE 101 (or to the UE 101 from the gateway 103) at time T2. The difference in the total time it takes for the signal to be transmitted in the first signal path and the signal to be transmitted in the second signal path is referred to as a delay variation and may be denoted as $2\times|(T_{s1}+T_{f1})-(T_{s2}+T_{f2})|$ (e.g., as explained above, the maximum NTN GW-UE delay variation with an LEO satellite transparent payload at a 600 km altitude may be up to ±40 µs/sec).

To address propagation delay variations in NTN networks, a TA applied by an NR NTN UE in the RRC_CONNECTED state may be given according to Equation (4), below.

$$T_{TA}=(N_{TA}+N_{TA,UE\text{-}specific}+N_{TA,common}+N_{TA,offset})\times T_c \quad \text{Equation (4)}$$

In Equation (4), $N_{TA}$ is defined as 0 for physical RACH (PRACH) and updated based on a TA command field in msg2/msgB and a MAC CE TA command. $N_{TA,UE\text{-}specific}$ is a UE self-estimated TA value to pre-compensate for the service link delay. $N_{TA,common}$ is a network-controlled common TA, and may include any timing offset considered necessary by the network (e.g., an $N_{TA,common}$ value of "0" may be supported), and $N_{TA,offset}$ is a fixed offset used to calculate the TA, as defined in Equation Error! Reference source not found., above.

In Equation Error! Reference source not found., for determining the TA update, the UE should update $N_{TA}$ based on a closed loop mechanism and update ($N_{TA,UE\text{-}specific}$+$N_{TA,common}$) based on an open loop mechanism.

For updating $N_{TA}$ in an RRC_CONNECTED state, NR NTN may reuse the NR mechanism based on a TA command field in msg2/msgB and a MAC CE TA command without specific changes. This mechanism may be referred to as closed loop because it is based on the TA command that the UE receives from the network.

Updating ($N_{TA,UE\text{-}specific}$+$N_{TA,common}$) based on an open loop mechanism will now be described.

This mechanism may be called open loop because it is based on the UE specific calculations and/or estimations using the information that is sent from the network to the UE. The necessity of an open loop TA update may be linked to a high round trip delay (RTD) drift on a service link and a feeder link, especially in case of non-geostationary (NGEO) satellite scenarios. For such scenarios, using only closed loop may not be sufficient to update a TA. With a TA update based on open loop, the UE can autonomously track the RTD variation on both service link and feeder link to keep the residual timing error within a maximum tolerable range that could be absorbed by the CP.

In an RRC_CONNECTED state, the NR NTN UE should update $T_{TA}$ so that the CP can absorb the propagation delay variation due to the movements of both the satellite and the UE. With an open loop TA update, the UE may compensate for the delay so that the residual delay can be absorbed by the CP in use. A general rule for a UE's timing to stay synced with a gNB is that the timing drift between the UE and the gNB should be within ±(CP−channel delay spread)/2.

In the following discussion, without loss of generality, the channel delay spread is considered to be negligible since it may be smaller than the CP for typical NTN scenarios.

Accordingly, it can be deduced that for an SCS of 15 kilohertz (kHz), where a CP is 4.69 µs, the UE should estimate a TA within ±2.34 µs, or equivalently, the UE should estimate a distance to the reference point (e.g., the gNB) within ±704 meters (m) (=±2.34 µs×the speed of light in free space (c)). Similarly, for an SCS of 120 kHz, where the CP is 0.59 µs, the UE should estimate a TA within ±0.29 µs or equivalently its distance to the reference point within ±88 m.

In addition, the UE may autonomously predict and correct the common delay, $N_{TA,common}$, within 0.15 µs provided that updated common TA related assistance information is available at the UE during the last 0.7 seconds when a common TA drift rate is indicated to the UE or during the last 5 seconds when both common TA drift rate and common drift variation rate are indicated to the UE.

Moreover, the UE may also autonomously predict and correct the delay on service link within a timing error range of 0.15 µs provided that updated satellite ephemeris data is available at the UE during the last 45 seconds.

As a result, by updating $N_{TA,UE\text{-}specific}$+$N_{TA,common}$, the UE could autonomously track the RTD variation on both the service link and feeder link to keep the residual timing error within a maximum tolerable range that could be absorbed by the CP for the worst case of a 120 kHz SCS, i.e. 0.59 µs.

Beam/BWP switching will now be described.

Frequency division multiplexing (FDM) allocation for each satellite beam may be the most effective way to avoid the inter-beam interference. In order to accomplish FDM allocation for each satellite beam, adjacent beams may be assigned to different center frequencies. In other words, a frequency reuse factor (FRF) greater than 1 should be used to lower the inter-beam interference and increase a signal-to-interference-noise-ratio (SINR). For example, an FRF of 3 or an FRF of 2 combined with polarization reuse, may deliver satisfactory SINR for all NTN scenarios. To implement an FRF greater than 1 in an NTN network, the concept of a BWP may be used. In the BWP approach, the total operating band of the satellite may be divided into multiple non-overlapping BWPs.

Figure 2:
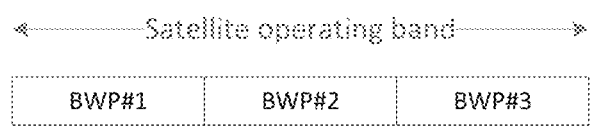
FIG. 2 illustrates a satellite operating band divided into 3 equal BWPs, according to an embodiment.

FIG. 2 illustrates a satellite operating land divided into 3 equal BWPs, according to an embodiment.

Referring to FIG. 2, BWP#1, BPW#2, and BWP#3 are shown to be configured in a satellite operating band. Additionally, there can be up to 4 configured BWPs indexed from 1 to 4, namely BWP#1, BWP#2, BWP#3, and BWP#4. The bandwidths of the MVPs do not have to necessarily be equal and, depending on the load of each beam, could be configured with different bandwidths.

Figure 3:
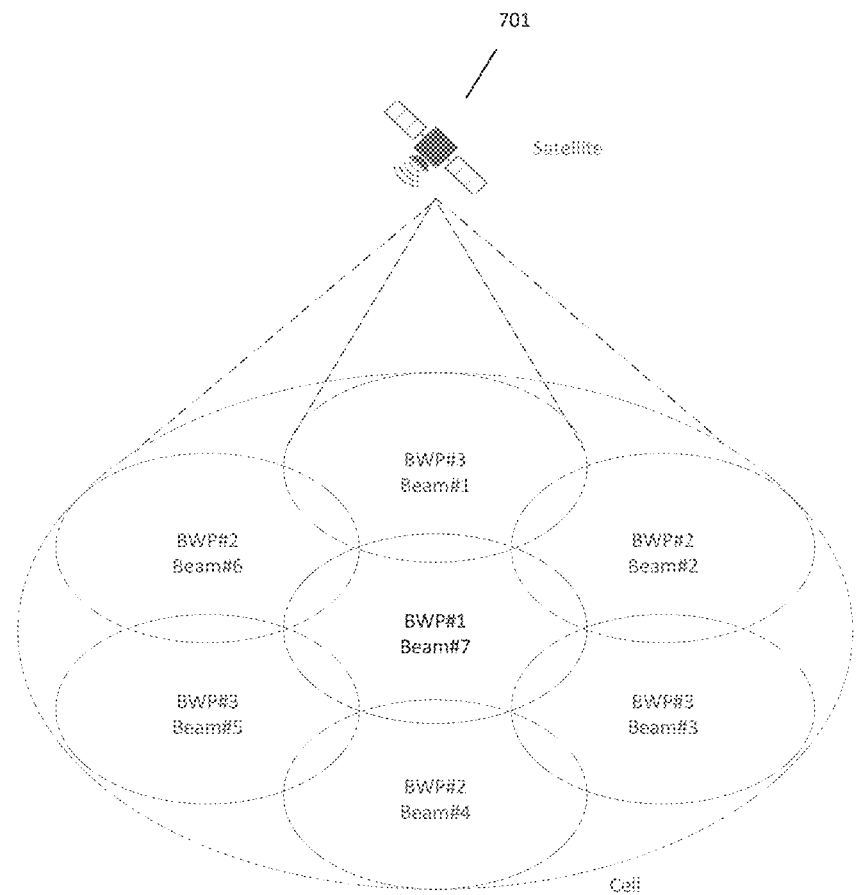
FIG. 3 illustrates a configuration in which 7 satellite beams are assigned to 3 BWPs, according to an embodiment.

FIG. 3 illustrates a configuration in which 7 satellite beams are assigned to 3 BWPs, according to an embodiment.

Referring to FIG. 3, each beam transmitted from satellite 301 is assigned to a BWP such that the adjacent beams are assigned to separate BWPs. That is, Beam#1 is assigned to BWP#3, Beam#2 is assigned to BWP#2, Beam#3 is assigned to BWP#3, Beam#4 is assigned to BWP#2, Beam#5 is assigned to BWP#3, Beam#6 is assigned to BWP#2, and Beam#7 is assigned to BWP#3. Beam#1-Beam#7 may be included in an individual cell. Since the BWPs are substantially non-overlapping, the inter-beam interference may be mitigated. The mapping assignment between beams and BWPs is part of the beam planning and is up to the network designer. Although FIG. 3 shows an example where 7 satellite beams are assigned to 3 BWPs, other variations are possible.

Beam management and beam switching will now be described.

For NR, the beam management procedure may be used to select the best beam for a UE. For beam selection, the UE may measure a synchronization signal block (SSB) or a non-zero power (NZP)-channel state information (CSI)-reference signal (RS) (NZP-CSI-RS) of the serving and adjacent beams and report the measurements to the gNB.

Based on the reported measurements, the gNB may select the best serving beam for the UE. The gNB may indicate the serving beam to the UE by a transmission configuration index (TCI) state on downlink control information (DCI) or a MAC CE. The TCI state may include fields for a cell index, a BWP index, an SSB index, and a CSI-RS for a specific control resource set (CORESET). For a physical downlink control channel (PDCCH), the MAC CE may be used to activate one TCI state out of a set of TCI states that have been configured using RRC signaling for each CORESET. For a physical downlink shared channel (PDSCH), DCI in the PDCCH can be used to indicate its TCI state, otherwise (i.e. the presence of a TCI field in DCI is not configured), and a TCI state for PDSCH will follow a PDCCH TCI state.

BWP Switching will now be described.

A gNB can dynamically switch the active BWP using the BWP indicator field within DCI formats 0_1 and 1_1. The BWP indicator field within DCI may indicate to the UE which BWP the frequency domain resource allocation is located. The switching procedure from one BWP index to another may not be instantaneous, so the gNB may not be able to allocate resources immediately after switching the BWP. The switching delay may be specified by 5G NR. The UE can be configured with a default downlink BWP. If the UE is configured with a bwp-InactivityTimer, then the UE switches back to the default BWP after the inactivity timer is expired while using a non-default BWP.

5G NR does not specify an association between a beam index and a BWP index. In NTN, where beams and BWPs are associated with each other, a network should account for switching the beam and switching the BWP for a UE as two individual tasks, even though they would happen simultaneously as a UE moves from one beam to another due to the movement of the satellite or the UE.

NTN may be required to support UE mobility up to 1,200 km/hour (h) speeds. Moreover, LEO satellites could travel at speeds up to 7.4 km/s. For an LEO satellite, even if the footprint size of a beam is 1000 km, it may take only about 2 minutes for a UE to switch from one beam to another. In more practical scenarios, the footprint size of an LEO satellite beam could be much smaller than 1000 km and therefore the dwell time that a UE stays in a beam and then switches to another could be much shorter than 2 minutes. Satellite movements (speed and direction), however, are accurately predictable. Networks may be able to determine the location of the satellite and may also be able to predict the location of the satellite in the near future. Satellites' ephemeris information may also be indicated to the UE, such that UE may be able to predict the location of the satellite.

If a network and/or UE are also aware of the topology of the satellite beams, beam switching could be predictable for the network and/or the UE. Frequent beam switching, however, may come at the expense of overwhelming signaling, and possible delays and latency for the network that could be prohibitive. Since satellite beam switching can be frequent and highly predictable, it is beneficial to reduce redundant signaling overhead and latency, if the target beam and the switching condition are configured to the UE in advance. The predictability of the satellite movement can be utilized to assist with faster beam switching with a reduced amount of signaling. Accordingly, the present disclosure provides solutions for configured beam and BWP switching.

In addition, as mentioned earlier, the TA applied by an NR NTN UE in the RRC_CONNECTED state may be given by Equation Error! Reference source not found., above. Equation Error! Reference source not found. consists of two components, namely; open loop and closed loop. Equation Error! Reference source not found. provides a general guidance that for a TA update in an RRC_CONNECTED state, the combination of both open (i.e., UE autonomous TA estimation, $N_{TA,UE-specific}$, and common TA estimation, $N_{TA,common}$) and closed (i.e., received TA command, $N_{TA}$) control loops shall be supported for NR NTN.

Adding the closed loop TA command update received from the gNB and the open loop TA value that has been autonomously estimated by the UE may result in an inaccurate TA value. For example, the resulting TA value may erroneously result in double correction. In addition, the TA command may be based on the latest uplink transmission and may be susceptible to being outdated. On the other hand, autonomous TA estimation by the UE could also be erroneous because the estimation error that the UE may have for the self-estimated TA component (e.g., the open loop component) may be too large.

Thus, combining both closed loop and open loop TA updates to achieve accurate and precise TA timing estimation is needed.

Regarding how to combine the closed loop and open loop components together, there are several different scenarios in NTN that may require difference combinations. The scenarios may vary based on the RTD and the satellite speed.

Thus, in accordance with embodiment of the present disclosure, a flexible solution is provided that may be used for different scenarios.

For a geostationary (GEO) satellite scenario, the satellite may have an orbital period equal to the Earth's rotational period and thus appear motionless at a fixed position in the sky to ground observers. For example, the maximum distance between a satellite and user equipment at a minimum elevation angle may be 40,581 km. This means that the maximum RTD would be 541.46 ms for the transparent satellite. In the transparent satellite, the gNB and the gateway may be located on ground and the satellite may receive the signal from the gateway, convert the carrier frequency, and filter and amplify it before transmitting it back to ground on the downlink.

The GEO satellite scenario may support UEs motions on the Earth up to 1200 km/h. This means that by the time the UE receives the closed loop TA command, it could have been relocated by ±180 meters (m), which is equivalent to ±0.6 μs in timing. Therefore, for an SCS of 15 kHz, where the error margin for TA is ±2.34 μs, a TA command would be satisfactory and there is no need to perform open loop TA estimation. However, for an SCS of 120 kHz, where the error margin for TA is ±0.29 μs, a TA command would not be enough to compensate for the TA, and the open loop TA estimation would be need to be performed.

For LEO and MEO satellite scenarios, both a closed loop and an open loop estimation may be needed. For example in case of an LEO satellite scenario at 1200 km, for the maximum RTD of 41.77 ms, a TA command sent by the gNB could be outdated by 1.66 μs at the time of its arrival. This is much greater than the error margin for TA, which is ±0.29 μs for an SCS of 120 kHz.

According to an embodiment, the network may configure the UE to use the closed loop or the open loop TA update with priority. That is, in some situations the closed loop method and not the open loop method may be used (e.g., when the closed loop method is prioritized) ($N_{TA}$ is used, and $N_{TA,UE\text{-}specific}+N_{TA,common}$ is not used). In other situations, the open loop method and not the closed loop method may be used (e.g., when the open loop method is prioritized) ($N_{TA,UE\text{-}specific}+N_{TA,common}$ is used, and $N_{TA}$ is not used).

This method is flexible enough to support different scenarios with different RTDs and different UE mobility characteristics. The priority can be given either to the open loop or to the closed loop, and a timer may be set by the UE. The priority can either be pre-configured, or configured by the network. Also, the timer may be configured by the network. These configurations can be done by dedicated or common RRC signaling (e.g., using an SIB).

The UE may use the open loop or the closed loop method based on the configured priority. However, if the information that is needed for the respective method is not available for a given time, then the UE may revert (or change) to the other method. The time that the UE waits before reverting to the other method may be configurable by the network.

Figure 4:
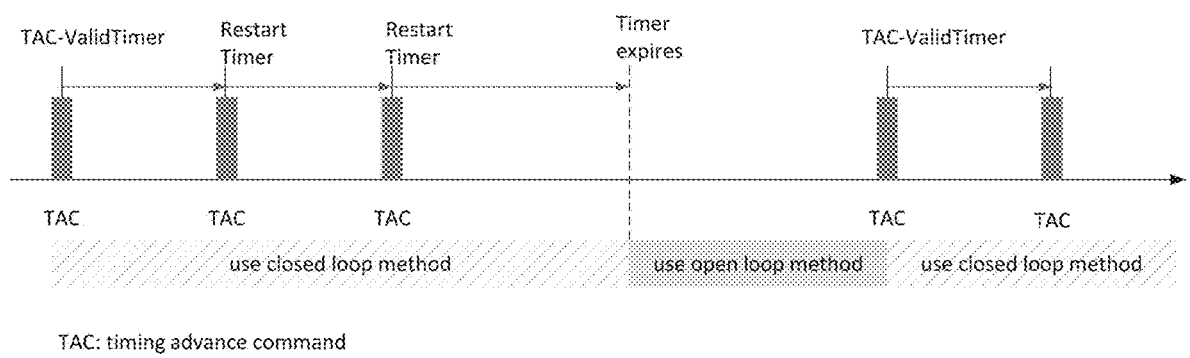
FIG. 4 is a timing diagram illustrating closed loop priority for a TA command, according to an embodiment.

FIG. 4 is a timing diagram illustrating closed loop priority for a TA command, according to an embodiment.

Referring to FIG. 4, if the UE is configured with priority for the closed loop method but the TA command for closed loop is not received by the UE within a configured time TAC-ValidTimer, then the UE may not use closed loop method anymore and starts using the open loop method.

For example, the TAC-ValidTimer may be set to a predetermined time value (e.g., 20 μs). The TAC-ValidTimer may be initiated by the UE each time the UE receives a TA command. If the UE does receive a TA command within the time value of the TAC-ValidTimer (e.g., 20 μs), then the timer will have expired, and the UE may begin using the open loop method.

Figure 5:
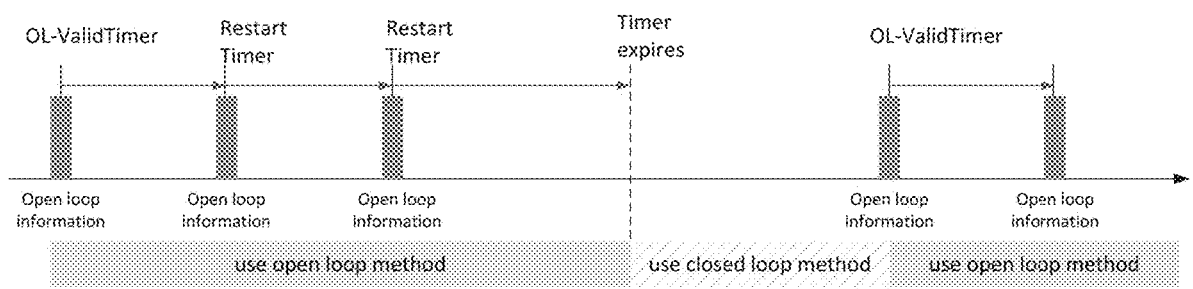
FIG. 5 is a timing diagram illustrating open loop priority for a TA command, according to an embodiment.

FIG. 5 is a timing diagram illustrating open loop priority for a TA command, according to an embodiment.

Referring to FIG. 5, if the UE is using the open loop method and an update for the $N_{TA,common}$ is not available, the satellite ephemeris data is not available and/or the UE's internal global navigation satellite system (GNSS) signal (e.g. a global positional system (GPS) signal) fails, the UE may not be able to estimate the TA autonomously. In this case, the OL-ValidTimer may be restarted based on open loop information. Open loop information may include one or more of satellite ephemeris data satellite positioning information), UE positioning information, and/or a valid $N_{TA,common}$. In addition, open loop information may be stored on the UE and regularly updated by the UE itself (e.g., updated using UE positioning information) or by the network (e.g., updated using satellite positioning information and/or $N_{TA,common}$). After the timer OL-ValidTimer expires, the UE may revert to the closed loop method.

A priority configuration and each of the timer configurations may be done through an RRC configuration or reconfiguration, or using a MAC CE command. The configuration can be done for all UEs inside the cell (cell-specific) or can be done for individual UEs (UE-specific).

Figure 6:
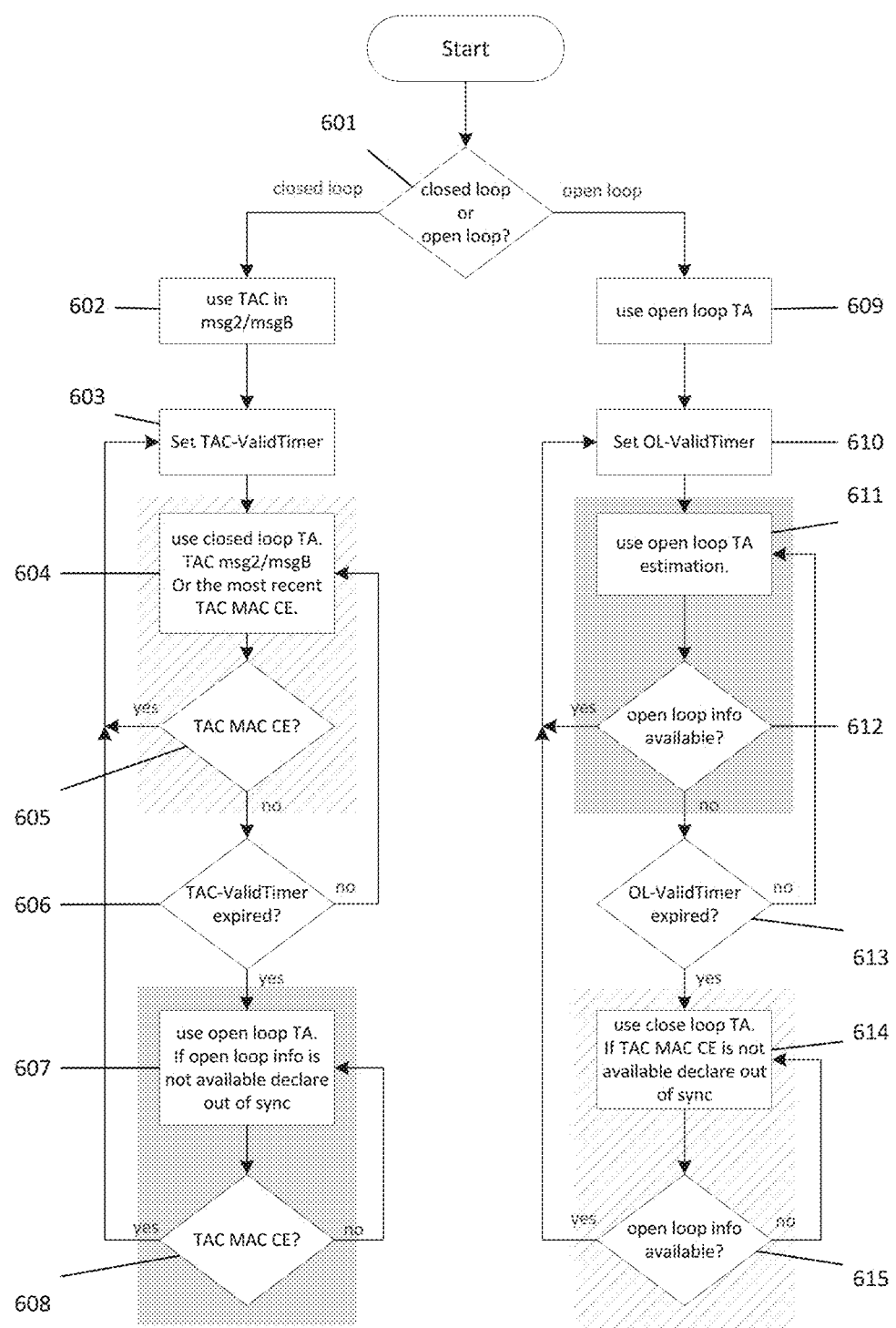
FIG. 6 illustrates a flowchart for closed loop and open loop priority configurations, according to an embodiment.

FIG. 6 illustrates a flowchart for closed loop and open loop priority configuration methods, according to an embodiment.

The methods of FIG. 6 may be performed by a UE, a satellite, a gNB, or another network device. In addition, the term "TAC" is shown in the drawing and is an abbreviation of "TA command".

Referring to FIG. 6, in step 601, the UE determines whether the closed loop method or the open loop method should be used. The determination may be made based on a number of factors explained above (e.g., the altitude of the satellite and the expected propagation delay).

If the closed loop method is used, then in step 602, the UE uses a TA command. For example, the UE may receive the TA command based on msg2/msgB.

In step 603, the UE sets a timer value for the TAC-ValidTimer. The TAC-ValidTimer may be set (or reset) each time the TA command is received.

In step 604, closed loop TA is used. For example, a TA command may be received in msg2/msgB or as a most recent TA command MAC CE.

In step 605, the UE determines whether the TA command is a TA command MAC CE. If the TA command is the most recent TA command MAC CE, then the method returns to step 603. Otherwise, if the TA command is not the TA command MAC CE, the UE determines whether the TAC-ValidTimer has expired in step 606.

If the TAC-ValidTimer has not expired in step 606, then the method returns to step 604 and closed loop TA is used. On the other hand, if the TAC-ValidTimer has expired in step 606, then in step 607, the UE switches to using an open loop TA method, and if open loop info is not available, then the signal timing may be declared to be out of sync.

In step 608, UE determines whether a TA command is a TA command MAC CE. If the TA command is the TA command MAC CE, then the method returns to step 603. Otherwise, if the TA command is not the TA command MAC CE, then the method returns to step 607.

Referring back to step 601, if the open loop method is used, the UE uses an open loop TA in step 609. In step 610, the UE sets an OL-ValidTimer time value. As explained above, the OL-ValidTimer may be set (or reset) based on open loop information.

In step 611, the UE uses the open loop method to estimate a TA.

In step 612, the UE determines whether open loop information is available. If open loop information is available, then the method returns to step 610. However, if open loop information is not available, then the UE determines whether the OL-ValidTimer has expired in step 613.

If the OL-ValidTimer has not expired in step 613, then the method returns to step 611 and open loop TA is used. On the other hand, if the OL-ValidTimer has expired, then in step 614, the UE switches to using a closed loop TA method, and if TA command MAC CE is not available, then the signal timing may be declared to be out of sync.

In step 615, the UE determines whether open loop information is available. If open loop information is available, then the method returns to step 610. If open loop information is not available, then the method returns to step 614

According to another embodiment, the UE may not prioritize any TA (e.g., neither closed loop or open loop are prioritized). This could apply for cases where the RTD is low, and could cover a case of high altitude platform stations (HAPSs) with large SCS. In such a case, the UE would simply add the open loop and closed loop components as is.

Accordingly, based on the TA description discussed above, the value of $N_{TA}$ may be udated based Procedure (1) and Procedure (2), below:

---

For $N_{TA}$ update/accumulation:
    If closed loop is prioritized;
        If TAC-Valid, update $N_{TA}$ based on gNB command;
        Else do not update;
    Else //open loop prioritized;
        If OL-Valid do not update;
        Else update $N_{TA}$ based on gNB command;
    End.
    ... Procedure (1)
For $N_{TA,\ UE\text{-}specific}$:
    If closed loop is prioritized;
        If TAC-Valid, do not update;
        Else update $N_{TA,\ UE\text{-}specific}$ based on open loop computation;
    Else //open loop prioritized;
        If OL-Valid, update $N_{TA,\ UE\text{-}specific}$ based on open loop computation;
        Else do not update;
    End.

---

Accordingly, the description above provides configurations and conditions that define whether open loop or closed loop should be prioritized, and also details the use and function of a timer for determining whether the open loop or closed loop component will be used.

With respect to beam/BWP switching, four methods are provided for achieving improved beam/BWP switching: network-initiated configured beam/BWP switching; UE-initiated configured beam/BWP switching; conditional beam/BWP switching; and group beam/BWP switching.

A network-initiated configured beam/BWP switching method will now be described.

In this embodiment, the network may configure the UE with a list of TCI state indices. The configuration may be done through an RRC configuration or reconfiguration. The network may configure a UE by a UE-specific configuration or a group of UEs together by a group configuration. The list of TCI state indices may be calculated based on the UE's location, the satellite movement direction and the beam/BWP planning. The network may be provided with the knowledge of the satellite location and movement direction as well as the beam/BWP planning (e.g., via the UE or via a cloud storage system). The network may acquire a UE's location information by the UE sending its location periodically to the network. The network may also estimate the UE's location based on the UE's TA value.

For NTN, the beam/BWP switching may be caused by the movement of the satellite, hence the network may be able to predict the beam footprints that the UE will be going through in the near future.

Figure 7:
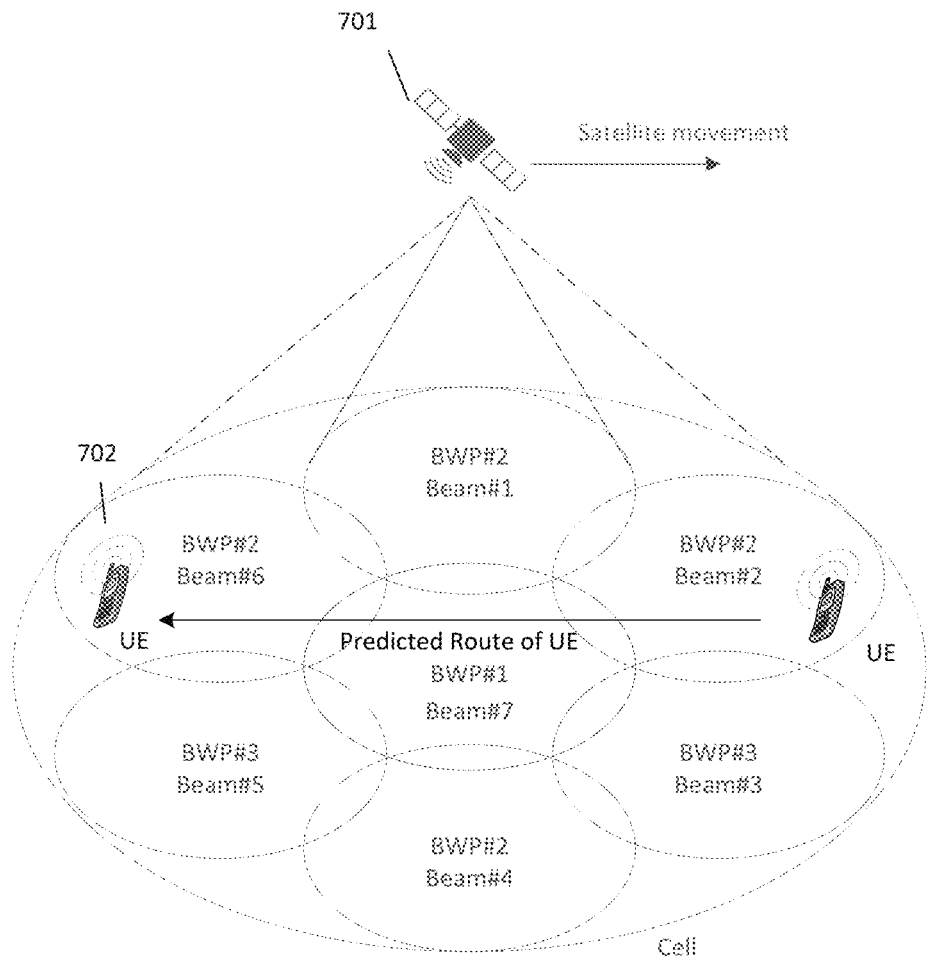
FIG. 7 illustrates a configuration in which 7 satellite beams are assigned to 3 BWPs, according to an embodiment.

FIG. 7 illustrates a configuration in which 7 satellite beams are assigned to 3 BWPs, according to an embodiment.

Referring to FIG. 7, each beam transmitted from satellite 701 is assigned to a BWP. Beam#1 is assigned to BWP#2, Beam#2 is assigned to BWP#2, Beam#3 is assigned to BWP#3, Beam#4 is assigned to BWP#2, Beam#5 is assigned to BWP#3, Beam#6 is assigned to BWP#2, and Beam#7 is assigned to BWP#1. Beam#1-Beam#7 may be included in an individual cell. Since the BWPs are substantially non-overlapping, the inter-beam interference may be mitigated.

As shown in FIG. 7, based on the movement of the satellite 701, the network can predict that the route of the UE 702 will go through Beam#2, Beam#7, and Beam#6. The network can indicate a list of TCI state indices that are mapped to those beams, respectively. When, according to the network prediction, the UE 702 approaches the beam edge, it will be informed by the network or the gNB to perform beam switching through RRC signaling, a MAC CE, or DCI activation.

Additionally, while beam switching, the network or the gNB may have the UE switch the BWP by sending a scheduling DCI to the UE with the new BWP index filled in BWP indicator field in the DCI format 0_1 or DC1 format 1_1.

Since there is a mapping configuration between beams and BWPs, the UE may be configured by mapping information, and as the UE may be informed by the network to perform beam switching, the UE can perform the corresponding BWP switching as well.

As the satellite moves, the UE may also move such that it deviates from the path initially predicted by the network.

Figure 8:
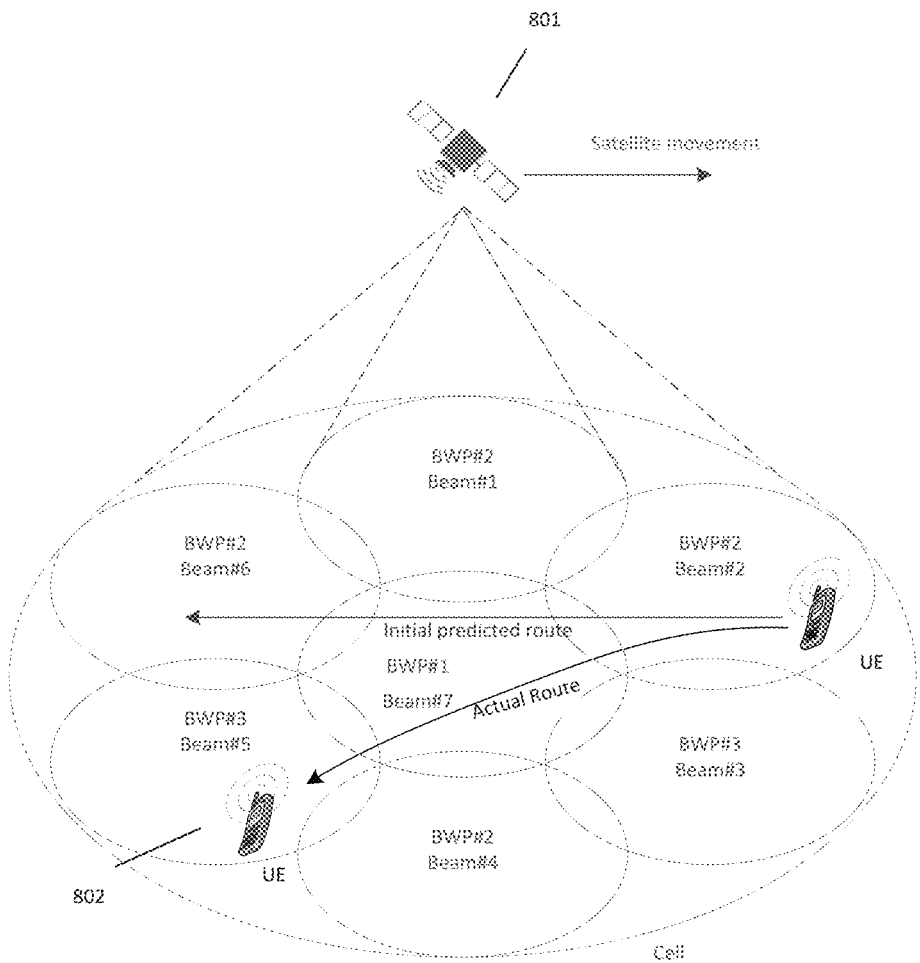
FIG. 8 illustrates a configuration in which 7 satellite beams are assigned to 3 BWPs, according to an embodiment.

FIG. 8 illustrates a configuration in which 7 satellite beams are assigned to 3 BWPs, according to an embodiment.

Referring to FIG. 8, each beam transmitted from satellite 801 is assigned to a BWP. Beam#1 is assigned to BWP#2, Beam#2 is assigned to BWP#2, Beam#3 is assigned to BWP#3, Beam#4 is assigned to BWP#2, Beam#5 is assigned to BWP#3, Beam#6 is assigned to BWP#2, and Beam#7 is assigned to BWP#1. Beam#1-Beam#7 may be included in an individual cell. Since the BWPs are substantially non-overlapping, the inter-beam interference may be mitigated.

As shown in FIG. 8, since the network cannot accurately predict the movement of the UE 802, it initially predicts that the UE 802 will go through Beam#2, Beam#7, and Beam#6. However, since both the UE and the satellite move, the UE will actually go through Beam#2, Beam#7, and Beam#5. If the UE's location is being updated periodically, the network may be able to change the prediction and reconfigure the UE with an updated list of TCI state indices.

Next, a UE-initiated configured beam/BWP switching method (e.g., a beam/BWP switching method initiated by the UE) will now be described.

Figure 9:
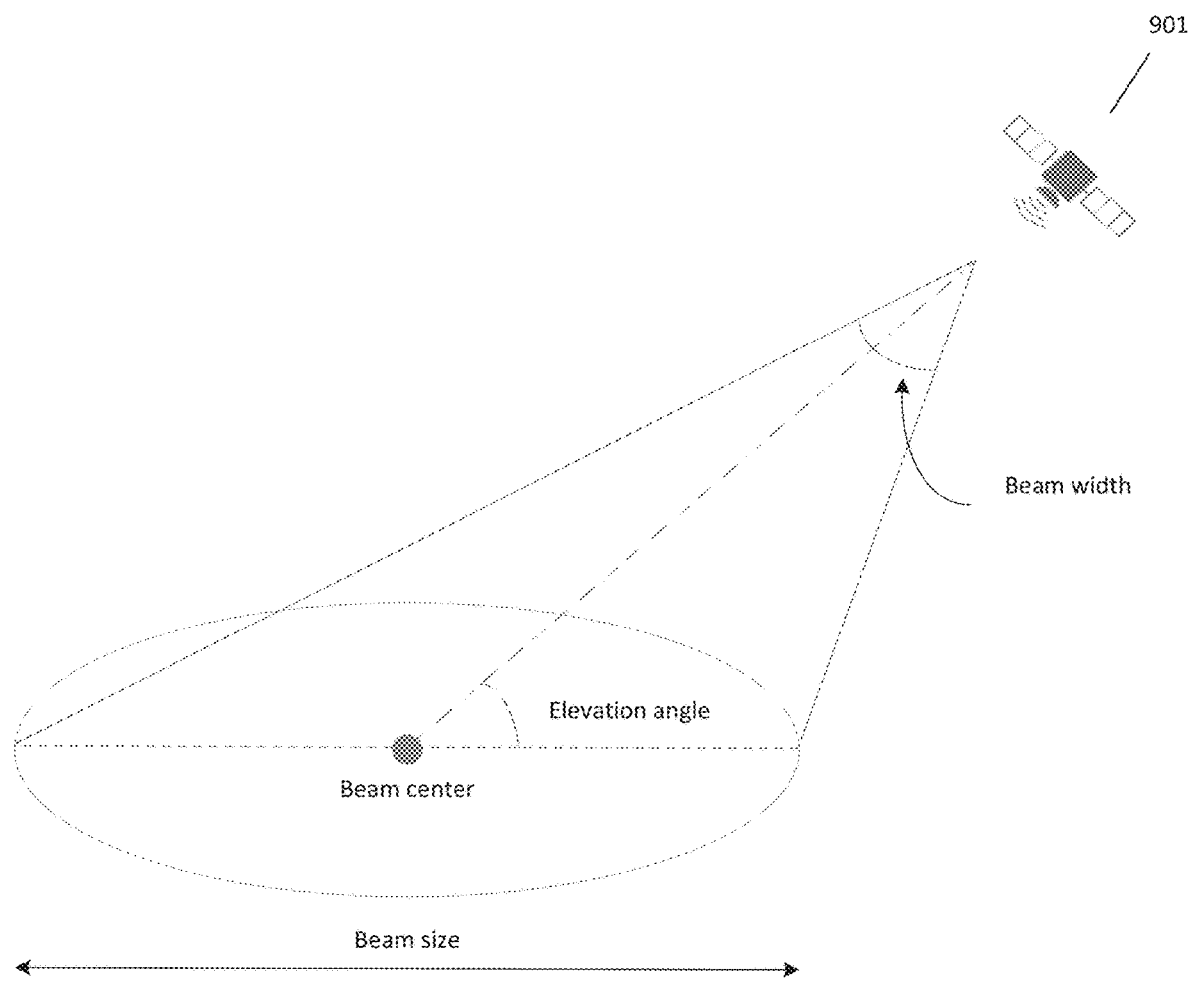
FIG. 9 illustrates a configuration in which beam information is broadcasted to a network, according to an embodiment.

FIG. 9 illustrates a configuration in which beam information is broadcasted to a network, according to an embodiment.

Referring to FIG. 9, beam information, such as a beam width, a beam center location, a beam size, and a beam center elevation angle may be broadcast by a satellite 901 to a network in system information, such as a master information block (MIB) or system information block (SIB).

Having such information, the UE can calculate the beam topology of its surrounding area. Alternatively, the network may configure the UE with a list of TCI state indices according to the beam/BWP planning, as explained above (e.g., with reference to FIG. 8). The UE also may have its own location information, either through GNSS capability information, or through a network positioning service. With all this information, the UE may have the full knowledge of when to do beam/BWP switching and which beam/BWP to switch to. Accordingly, once the UE approaches a beam edge, it can switch to an adjacent beam.

A conditional beam/BWP switching method will now be described.

Beam/BWP switching could be conditional, in a similar way to which a conditional handover is performed. In addition to the list of TCI state indices, described above, the UE can be provided with a condition as to when it should initiate the beam/BWP switching. The condition could be based on an RS received power (RSRP) threshold, an RS strength indicator (RSSI) threshold, and a quality threshold. The condition could be pre-configured for the UE/cell, or could be communicated by dedicated and/or common RRC signaling. The condition could be linked to a TCI state, where each TCI state includes a condition.

For example, when the UE is in TCI state k, the UE may monitor the parameters associated with the condition in TCI state k. When the condition is fulfilled, the UE may initiate beam/BWP switching to another TCI state j from the list of TCI indices that was provided to the UE. In addition, the conditional beam/BWP switching method can be applied to either UE-initiated or network-initiated beam/BWP switching.

Next a group beam/BWP switching method (e.g., sending a group command to a plurality of UEs) will be described.

Figure 10:
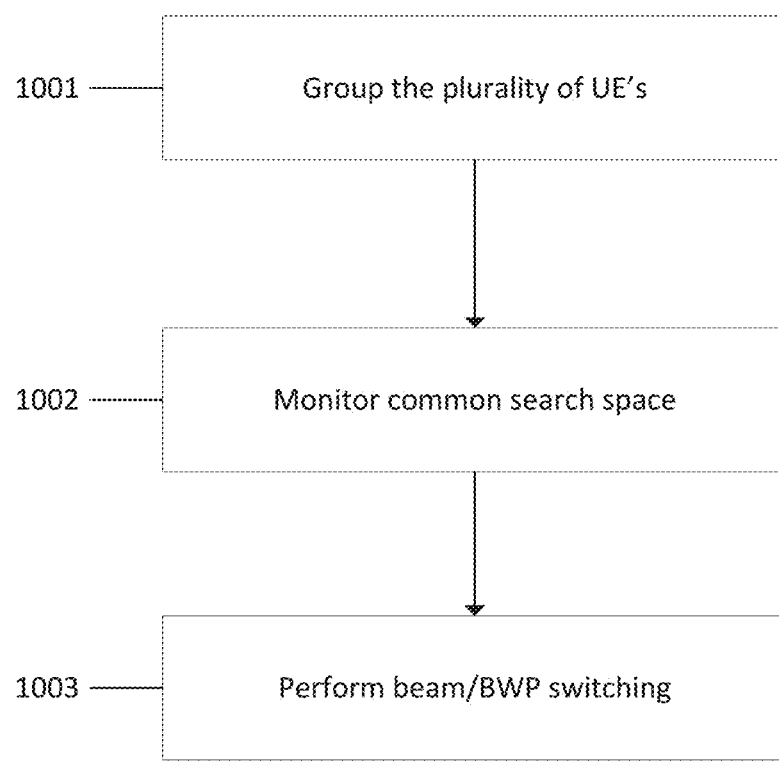
FIG. 10 illustrates a flowchart for a group beam/BWP switching method, according to an embodiment.

FIG. 10 illustrates a flowchart of a group beam/BWP switching method, according to an embodiment.

According to a method, in step 1001, the plurality of UEs are grouped. The plurality of UEs may be grouped in a plurality of different ways. For example, grouping may be done by higher layers. For instance, UEs in a plane could be assigned to the same group. Each group may be assigned a GROUP_RNTI by the network.

Additionally or alternatively, grouping may be done based on geo-location. For example, a geographical area may be split into multiple zones. Each zone could be a predetermined shape, such as a rectangle. UEs within a zone are part of the same group. Each zone may be uniquely allocated a GROUP_RNTI by the network. When a UE moves from one zone to another, it may switch from one group to another and use the GROUP_RNTI associated with the new zone. The zoning information may be indicated by RRC signaling or other higher layer signaling.

An example of geo-location grouping is as follows. The UE requests the zoning information from the geographical area to which the UE belongs and sends its location information (sending location information may be done coarsely or embedded, to alleviate privacy concerns). The network then sends the zone information to the UE for the zones around/close to the UE's location. The zone information may include a list of zones that are within proximity to the UE. Each zone may include a geographical description of the zone (e.g., the coordinates of the corners), as well as an associated GROUP_RNTI. When the UE has significantly moved from its location when it got the zone information, it can request updated zoning information.

After having been grouped, in step 1002, the UEs monitor a common search space. The UEs may monitor the common search space for a group DCI (DCI format 2_X) to indicate beam/BWP switching. The DCI may include one bit to indicate switching and a TCI state index to use from now on, and may be scrambled by the GROUP_RNTI. Additionally or alternatively, the DCI may include a list of groups and TCI state indices. Each group in the DCI may switch to the corresponding TCI state index.

In step 1003, beam/BWP switching is performed when beam/BWP switching is indicated in the common search space.

The group switching could also be jointly done with the conditional switching. For zoning, each zone could additionally include and rely on a condition. When the conditions are met, the UE may switch on its own. In addition, the UE may receive the DCI group command, but perform the switch only when the condition is met. Thus, in practice, even close-by UEs could have different radio conditions due to various conditions, such as blockage. Having a conditional switch may provide each UE a little bit of leeway and ensure switching at the most opportune time.

Figure 11:
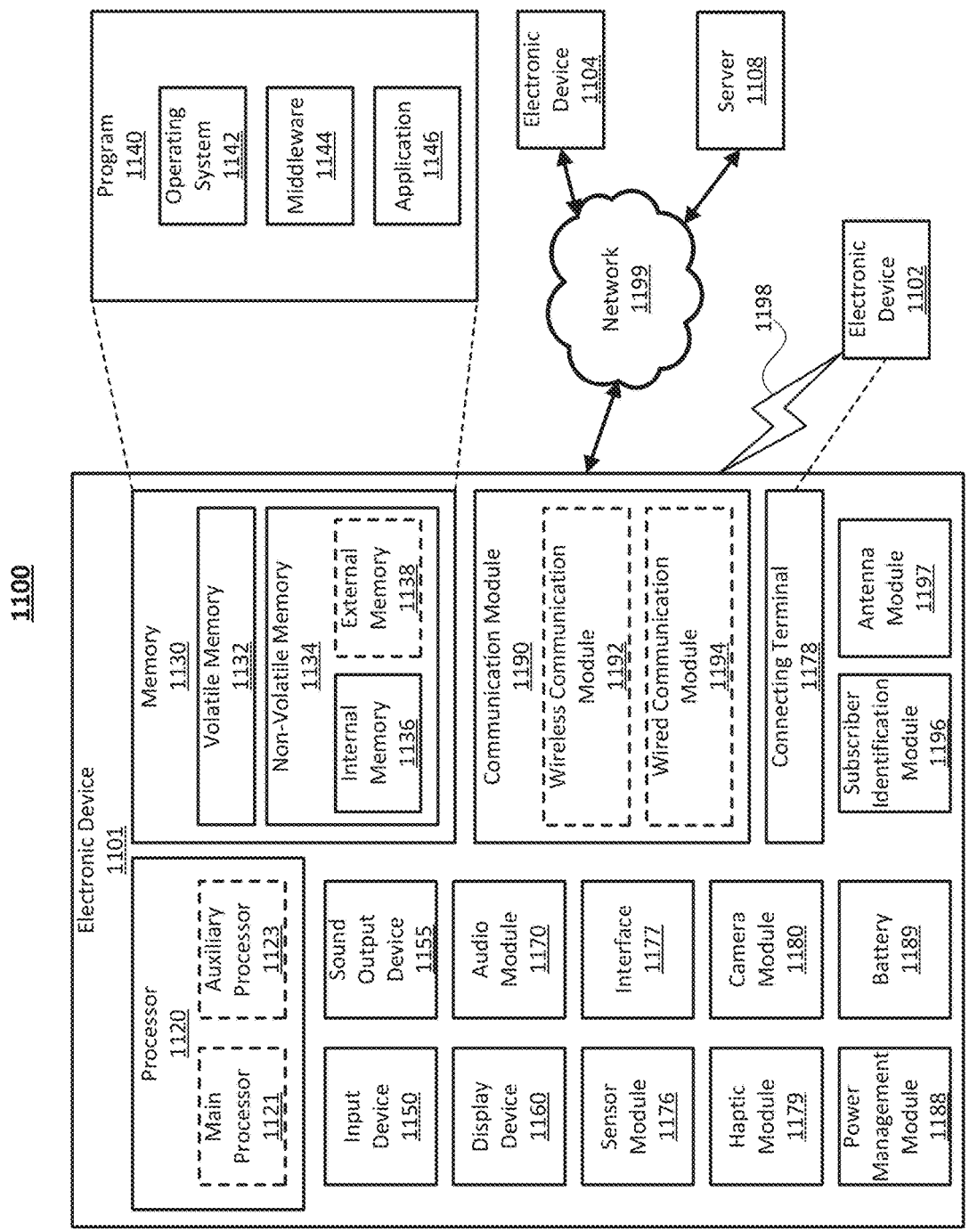
FIG. 11 illustrates an electronic device in a network environment, according to an embodiment.

FIG. 11 illustrates an electronic device in a network environment, according to an embodiment.

Referring to FIG. 11, the electronic device 1101, e.g., a mobile terminal including GPS functionality, in the network environment 1100 may communicate with an electronic device 1102 via a first network 1198 (e.g., a short-range wireless communication network), or an electronic device 1104 or a server 1108 via a second network 1199 (e.g., a long-range wireless communication network). The electronic device 1101 may communicate with the electronic device 1104 via the server 1108. The electronic device 1101 may include a processor 1120, a memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197 including a GNSS antenna. In one embodiment, at least one (e.g., the display device 1160 or the camera module 1180) of the components may be omitted from the electronic device 1101, or one or more other components may be added to the electronic device 1101. In one embodiment, some of the components may be implemented as a single integrated circuit (IC). For example, the sensor module 1176 (e.g., a fingerprint sensor, an iris sensor, or an illuminance sensor) may be embedded in the display device 1160 (e.g., a display).

The processor 1120 may execute, for example, software (e.g., a program 1140) to control at least one other component (e.g., a hardware or a software component) of the electronic device 1101 coupled with the processor 1120, and may perform various data processing or computations. As at least part of the data processing or computations, the processor 1120 may load a command or data received from another component (e.g., the sensor module 1176 or the communication module 1190) in volatile memory 1132, process the command or the data stored in the volatile memory 1132, and store resulting data in non-volatile memory 1134. The processor 1120 may include a main processor 1121 (e.g., a central processing unit (CPU) or an application processor, and an auxiliary processor 1123 (e.g., a graphics processing unit (GPU), an image signal processor (ISP), a sensor hub processor, or a communication processor) that is operable independently from, or in conjunction with, the main processor 1121. Additionally or alternatively, the auxiliary processor 1123 may be adapted to consume less power than the main processor 1121, or execute a particular function. The auxiliary processor 1123 may be implemented as being separate from, or a part of, the main processor 1121.

The auxiliary processor 1123 may control at least some of the functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to one embodiment, the auxiliary processor 1123 (e.g., an ISP or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, or a keyboard.

The sound output device 1155 may output sound signals to the outside of the electronic device 1101. The sound output device 1155 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to one embodiment, the display device 1160 may include touch circuitry adapted to detect a touch, or sensor circuit (e.g., a pressure sensor) adapted to measure the intensity of force incurred by the touch.

The audio module 1170 may convert a sound into an electrical signal and vice versa. According to one embodiment, the audio module 1170 may obtain the sound via the input device 1150, or output the sound via the sound output device 1155 or a headphone of an external electronic device 1102 directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. The sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device 1102 directly (e.g., wiredly) or wirelessly. According to one embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device 1102. According to one embodiment, the connecting terminal 1178 may include, for example, an HDMI connector, a USB connector, an SD card connector, or an audio connector (e.g., a headphone connector).

The haptic module 1179 may convert an electrical signal into a mechanical stimulus (e.g., a vibration or a movement) or an electrical stimulus which may be recognized by a user via tactile sensation or kinesthetic sensation. According to one embodiment, the haptic module 1179 may include for example, a motor, a piezoelectric element, or an electrical stimulator.

The camera module 1180 may capture a still image or moving images. According to one embodiment, the camera module 1180 may include one or more lenses, image sensors, ISPs, or flashes.

The power management module 1188 may manage power supplied to the electronic device 1101. The power management module 1188 may be implemented as at least part of, for example, a power management IC (PMIC).

The battery 1189 may supply power to at least one component of the electronic device 1101. According to one embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor) and supports a direct (e.g., wired) communication or a wireless communication. According to one embodiment, the communication module 1190 may include a wireless communication module 1192 (e.g., a cellular communication module, a short-range wireless communication module, or a GNSS communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or a standard of the Infrared Data Association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1192 may identify and authenticate the electronic device 1101 in a communication network, such as the first network 1198 or the second network 1199, using subscriber information (e.g., international mobile subscriber identity (IMSI)) stored in the SIM 1196.

The antenna module 1197 may transmit or receive a signal or power to or from the outside (e.g., the external electronic device) of the electronic device 1101. According to one embodiment, the antenna module 1197 may include one or more antennas, and, therefrom, at least one antenna appropriate for a communication scheme used in the communication network, such as the first network 1198 or the second network 1199, may be selected, for example, by the communication module 1190 (e.g., the wireless communication module 1192). The signal or the power may then be transmitted or received between the communication module 1190 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. All or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

One embodiment may be implemented as software (e.g., the program 1140) including one or more instructions that are stored in a storage medium (e.g., internal memory 1136 or external memory 1138) that is readable by a machine (e.g., the electronic device 1101). For example, a processor of the electronic device 1101 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Accordingly, as discussed above, the disclosure describes various embodiments capable of realizing new open-loop and closed-loop TA calculation methods that enable signals to be transmitted to/from a UE via LEO, MEO, and GEO satellites with accurate TA commands, thereby avoiding timing problems that are typically associated with signal transmission on NTN (e.g., double correction). In addition, the disclosure provides solutions for predicting satellite movement to assist in faster beam switching with improved efficiency and reduced signaling.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of performing a timing advance adjustment between a user equipment (UE) and a non-terrestrial network (NTN), the method comprising:
    receiving and decoding a medium access control (MAC) control element (CE) including closed loop information;
    receiving and decoding system information including open loop information;

determining a timing advance value based on either the closed loop information or the open loop information; and controlling timing of an uplink transmission signal, transmitted from the UE, based on the timing advance value, wherein determining the timing advance value comprises:

configuring a priority timer, assigning a priority to either a closed loop method or an open loop method, and using either the closed loop method or the open loop method to determine the timing advance value based on the assigned priority and a state of the priority timer.

2. The method of claim 1, wherein the closed loop information comprises a timing advance command, and wherein the open loop information comprises satellite ephemeris data and a common timing advance.

3. The method of claim 2, wherein determining the timing advance value comprises:

determining a closed loop timing advance component based on the timing advance command; and determining an open loop timing advance component, and wherein determining the open loop timing advance component comprises:

calculating a UE-specific timing advance based on a UE's position and the satellite ephemeris data; and determining the open loop timing advance component based on the UE-specific timing advance and the common timing advance.

4. The method of claim 1, wherein determining the timing advance value comprises:

when using the closed loop method to determine the timing advance value, determining the timing advance value based on the closed loop information; and when using the open loop method to determine the timing advance value, determining the timing advance value based on the open loop information.

5. The method of claim 4, wherein determining the timing advance value comprises:

when the priority is assigned to the closed loop method, reverting to the open loop method if the priority timer has expired; and when the priority is assigned to the open loop method, reverting to the closed loop method if the priority timer has expired.

6. The method of claim 5, further comprising, when the priority is assigned to the closed loop method, restarting the priority timer when a timing advance command is received.

7. The method of claim 5, further comprising, when the priority is assigned to the open loop method, restarting the priority timer when satellite ephemeris data and a common timing advance are available.

8. The method of claim 5, further comprising, when priority is assigned to the open loop method, reverting to the closed loop method if the UE's position cannot be determined.

9. The method of claim 1, wherein assigning the priority comprises assigning the priority to a plurality of UEs located within a cell.

10. The method of claim 1, wherein determining the timing advance value based on either the closed loop information or the open loop information comprises:

determining a first timing advance value based on the closed loop information at a first time; and determining a second timing advance value based on the open loop information at a second time, and wherein controlling the timing of the uplink transmission signal further comprises:

controlling the timing of the uplink transmission signal based on the first timing advance value at the first time, and controlling the timing of the uplink transmission signal based on the second timing advance value at the second time.

11. A user equipment (UE), comprising:

a memory; and a processor configured to:

receive and decode a medium access control (MAC) control element (CE) including closed loop information, receive and decoding system information including open loop information, determine a timing advance value based on either the closed loop information or the open loop information, control timing of an uplink transmission signal, transmitted from the UE, based on the timing advance value, configure a priority timer, assign a priority to either a closed loop method or an open loop method, and use either the closed loop method or the open loop method to determine the timing advance value based on the assigned priority and a state of the priority timer.

12. The UE of claim 11, wherein the closed loop information comprises a timing advance command, and wherein the open loop information comprises satellite ephemeris data and a common timing advance.

13. The UE of claim 12, wherein the processor is further configured to:

determine a closed loop timing advance component based on the timing advance command, and determine an open loop timing advance component by:

calculating a UE-specific timing advance based on a UE's position and the satellite ephemeris data; and determining the open loop timing advance component based on the UE-specific timing advance and the common timing advance.

14. The UE of claim 11, wherein the processor is further configured to:

when using the closed loop method, determine the timing advance value based on the closed loop information, and when using the open loop method, determine the timing advance value based on the open loop information.

15. The UE of claim 14, wherein the processor is further configured to:

when the priority is assigned to the closed loop method, revert to the open loop method if the priority timer has expired, and when the priority is assigned to the open loop method, revert to the closed loop method if the priority timer has expired.

16. The UE of claim 15, wherein the processor is further configured to, when the priority is assigned to the closed loop method, restart the priority timer when a timing advance command is received.

17. The UE of claim 15, wherein the processor is further configured to, when the priority is assigned to the open loop method, restart the priority timer when satellite ephemeris data and a common timing advance are available.

18. The UE of claim 15, wherein the processor is further configured to, when priority is assigned to the open loop method, revert to the closed loop method if the UE's position cannot be determined.

19. The UE of claim 11, wherein the processor is further configured to assign the priority to a plurality of UEs located within a cell.

20. The UE of claim 11, wherein the processor is further configured to:
- determine a first timing advance value based on the closed loop information at a first time,
- determine a second timing advance value based on the open loop information at a second time,
- control the timing of the uplink transmission signal based on the first timing advance value at the first time, and
- control the timing of the uplink transmission signal based on the second timing advance value at the second time.

* * * * *